(12) United States Patent  
Su et al.

(10) Patent No.: US 10,705,487 B2  
(45) Date of Patent: Jul. 7, 2020

(54) METHODS AND DEVICES FOR MODE SWITCHING

(71) Applicant: Xiaomi Inc., Beijing (CN)

(72) Inventors: Jun Su, Beijing (CN); Anju Chen, Beijing (CN); Yi Wang, Beijing (CN); Yi Wu, Beijing (CN)

(73) Assignee: Xiaomi Inc., Beijing (CN)

( * ) Notice: Subject to any disclaimer, the term of this patent is extended or adjusted under 35 U.S.C. 154(b) by 182 days.

(21) Appl. No.: 15/581,689

(22) Filed: Apr. 28, 2017

(65) Prior Publication Data

US 2017/0227935 A1 Aug. 10, 2017

Related U.S. Application Data

(63) Continuation of application No. PCT/CN2015/074519, filed on Mar. 18, 2015.

(30) Foreign Application Priority Data

Oct. 29, 2014 (CN) .......................... 2014 1 0596717

(51) Int. Cl.  
*G06F 17/00* (2019.01)  
*G05B 7/02* (2006.01)  
(Continued)

(52) U.S. Cl.  
CPC .............. *G05B 7/02* (2013.01); *G08C 17/02* (2013.01); *H04M 1/7253* (2013.01); *H04M 2250/12* (2013.01)

(58) Field of Classification Search  
CPC .......... G08C 17/02; G05B 7/02; G05B 15/02; G05B 2219/2642; H04M 1/7253; H04M 2250/12; H04M 1/72569; A61B 5/0002; A61B 5/02416; A61B 5/0476; A61B 5/0488; A61B 5/0496; A61B 5/1123; A61B 5/4812; A61B 5/681; A61M 2021/0016; A61M 2021/0027; A61M 2021/0044; A61M 2021/0083; A61M 21/02; A63B 2220/836; A63B 2225/50; A63B 2230/00;  
(Continued)

(56) References Cited

U.S. PATENT DOCUMENTS 9,395,792 B1\* 7/2016 Kahn .................... G06F 1/3231  
2006/0155389 A1 7/2006 Pessolano et al.  
(Continued)

FOREIGN PATENT DOCUMENTS

CN 1817029 A 8/2006  
CN 101266069 A 9/2008  
(Continued)

OTHER PUBLICATIONS

Office Action issued in Mexican Patent Application No. MX/a/2015/006653, dated Sep. 11, 2017.  
(Continued)

*Primary Examiner* — Zhipeng Wang  
(74) *Attorney, Agent, or Firm* — Finnegan, Henderson, Farabow, Garrett & Dunner, L.L.P.

(57) ABSTRACT

A method for a household electrical appliance to perform mode switching includes detecting whether a user is in a sleeping state, switching a current operation mode to a silent mode if the user is in the sleeping state, and operating in the silent mode.

20 Claims, 9 Drawing Sheets

(51) Int. Cl.
*G08C 17/02* (2006.01)
*H04M 1/725* (2006.01)

(58) Field of Classification Search
CPC ...... G06F 1/163; G06F 1/1694; G06F 1/3215; G06F 1/3231; G06F 2203/011; G06F 3/011; G06F 3/015; G06F 3/017; H04H 60/33; H04H 60/65; H04N 21/42201; H04N 21/42203; H04N 21/4223; H04N 21/4333; H04N 21/4334; H04N 21/443; H04N 21/466; H04N 7/163; H04R 1/028; H04W 52/0254; H05B 33/0803; H05B 33/0872; H05B 37/0227; H05B 37/0236; H05B 37/0272; Y02D 10/173; Y02D 70/00; Y02D 70/142; Y02D 70/144; Y02D 70/166; Y02D 70/26
See application file for complete search history.

(56) References Cited

U.S. PATENT DOCUMENTS

| | | | | |
|---|---|---|---|---|
| 2008/0295531 | A1* | 12/2008 | Song | F24F 11/30 62/157 |
| 2010/0125949 | A1* | 5/2010 | Stebbing | A47C 21/044 5/423 |
| 2012/0169465 | A1 | 7/2012 | Chang et al. | |
| 2012/0254909 | A1* | 10/2012 | Serdiuk | H04N 7/163 725/12 |
| 2013/0095459 | A1 | 4/2013 | Tran | |
| 2013/0339719 | A1 | 12/2013 | Jang | |
| 2014/0207292 | A1* | 7/2014 | Ramagem | G05B 15/02 700/278 |
| 2014/0330396 | A1* | 11/2014 | Chang | G05B 15/02 700/11 |
| 2014/0331859 | A1* | 11/2014 | Gruenbacher | B01D 46/44 95/26 |
| 2014/0334653 | A1* | 11/2014 | Luna | G05B 15/02 381/332 |
| 2015/0199616 | A1* | 7/2015 | Rajendraprasad | G06N 20/00 706/12 |
| 2015/0230750 | A1* | 8/2015 | McDarby | A61B 5/113 600/407 |
| 2015/0258301 | A1* | 9/2015 | Trivedi | G06F 16/636 600/28 |
| 2015/0306533 | A1* | 10/2015 | Matlin | B01D 46/448 96/420 |
| 2016/0029458 | A1* | 1/2016 | Liu | H05B 33/08 700/32 |
| 2016/0179197 | A1* | 6/2016 | Qian | G06F 1/1694 345/156 |
| 2016/0299483 | A1* | 10/2016 | Tong | A61B 5/1118 |

FOREIGN PATENT DOCUMENTS

| | | |
|---|---|---|
| CN | 201184983 Y | 1/2009 |
| CN | 102043385 A | 5/2011 |
| CN | 201828822 U | 5/2011 |
| CN | 102556077 A | 7/2012 |
| CN | 102707644 A | 10/2012 |
| CN | 102857824 A | 1/2013 |
| CN | 103062867 A | 4/2013 |
| CN | 103513820 A | 1/2014 |
| CN | 203812072 U | 9/2014 |
| CN | 203858579 U | 10/2014 |
| EP | 2263530 A1 | 12/2010 |
| GB | 2357217 A | 6/2001 |
| JP | H 6-249188 A | 9/1994 |
| JP | H 10-197034 A | 7/1998 |
| JP | 2002-228180 A | 8/2002 |
| JP | 2007-132558 A | 5/2007 |
| JP | 2007-132581 A | 5/2007 |
| JP | 2010-266882 A | 11/2010 |
| JP | 6167245 B2 | 12/2016 |
| RU | 2012144773 A | 5/2014 |

OTHER PUBLICATIONS

English version of International Search Report of PCT/CN2015/074519, mailed from the State Intellectual Property Office of China dated Jul. 1, 2015.
Extended European Search Report issued in European Patent Application No. 15191560.0, mailed from the European Patent Office, dated Mar. 4, 2016.
Office Action issued in Russian Patent Application No. 2015121585/07(033593), dated Feb. 1, 2017.
International Search Report of PCT/CN2015/074519, mailed from the State Intellectual Property Office of China dated Jul. 1, 2015.
Examination Report for Indian Application No. 4050/DELNP/2015, from the Indian Patent Office, dated Dec. 6, 2018.

\* cited by examiner

METHODS AND DEVICES FOR MODE SWITCHING

CROSS REFERENCE TO RELATED APPLICATIONS

The present application is a Continuation Application of International Application No. PCT/CN2015/074519, with an international filing date of Mar. 18, 2015, which is based upon and claims priority to Chinese Patent Application No. 201410596717.7, filed Oct. 29, 2014, the entire contents of both of which are incorporated herein by reference.

TECHNICAL FIELD

The present disclosure relates to automatic control and, more particularly, to methods and devices for mode switching.

BACKGROUND

Many household electrical appliances need to keep running when a user is sleeping. For example, a fan or an air conditioner needs to be turned on in summer, a humidifier needs to be turned on when the air is dry, an air purifier needs to be turned on when the air quality is poor, and so on.

In the conventional technology, a silent mode is typically provided in a household electrical appliance such as a fan, an air conditioner, a humidifier, an air purifier, or the like. When the user needs to go to sleep, the user may switch the household electrical appliance to the silent mode using a remote controller or through a control panel on the appliance. A household electrical appliance running in the silent mode produces much less noise than when operating in a normal mode.

SUMMARY

In accordance with the present disclosure, there is provided a method for a household electrical appliance to perform mode switching. The method includes detecting whether a user is in a sleeping state, switching a current operation mode to a silent mode if the user is in the sleeping state, and operating in the silent mode.

Also in accordance with the present disclosure, there is provided a method for a controlling device coupled to a household electrical appliance to perform mode switching. The method includes detecting whether a user is in a sleeping state, and sending, if the user is in the sleeping state, a mode switching instruction to the household electrical appliance to switch a current operation mode of the household electrical appliance so that the household electrical appliance operates in a silent mode.

Also in accordance with the present disclosure, there is provided a household electrical appliance device. The household electrical appliance device includes a processor and a non-transitory computer-readable storage medium storing instructions. The instructions, when executed by the processor, cause the processor to detect whether a user is in a sleeping state, switch a current operation mode to a silent mode if the user is in the sleeping state, and operate the device in the silent mode.

Also in accordance with the present disclosure, there is provided a controlling device coupled to a household electrical appliance. The controlling device includes a processor and a non-transitory computer-readable storage medium storing instructions. The instructions, when executed by the processor, cause the processor to detect whether a user is in a sleeping state, and send, if the user is in the sleeping state, a mode switching instruction to the household electrical appliance to switch a current operation mode of the household electrical appliance so that the household electrical appliance operates in a silent mode.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Through the above accompany drawings, the specific embodiments of the disclosure have been illustrated, for which a more detailed description will be given hereinafter. These drawings and textual description are not intended to limit the scope of the concept of the disclosure in any manner, but to explain the concept of the disclosure to those skilled in the art through particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects of the invention as recited in the appended claims.

Figure 1:
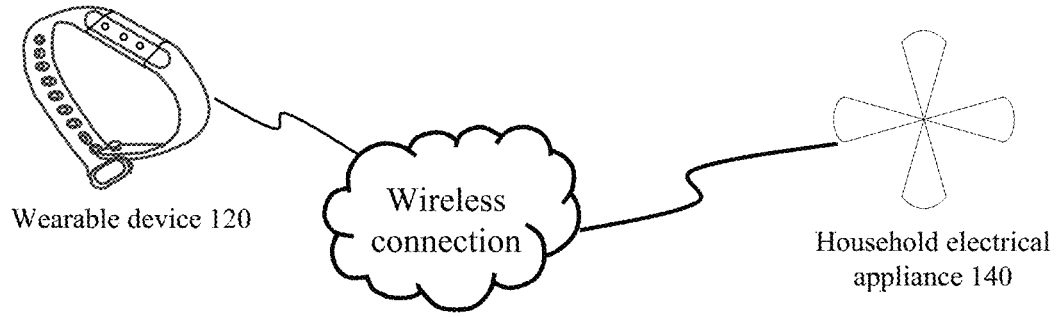
FIG. 1 is a schematic diagram of an implementing environment for methods for mode switching according to an exemplary embodiment.

FIG. 1 is a schematic diagram of an exemplary implementing environment for a method for mode switching consistent with embodiments of the present disclosure. This implementing environment includes a wearable device 120 and a household electrical appliance 140.

In some embodiments, as shown in FIG. 1, the wearable device 120 is connected to the household electrical appliance 140 through a wireless connection. The wireless connection may be a Bluetooth connection or a WiFi (Wireless-Fidelity) connection.

The wearable device 120 is an electronic device which is capable of acquiring physiological data of a user, and sending the physiological data to the household electrical appliance 140. The physiological data may include at least one of heartbeat, pulse, or body movement. In some embodiments, the wearable device 120 may be a smart wristband, a smart watch, a smart bracelet, a smart necklace, a smart ring, or smart glasses. The wearable device 120 is provided with a sensor configured to acquire the physiological data of the user, and the sensor may be a pulse sensor, a heart rate sensor, a gravity sensor and a gyro sensor, etc.

The household electrical appliance 140 may include at least one of a fan, an air conditioner, a humidifier, or an air purifier.

Figure 2:
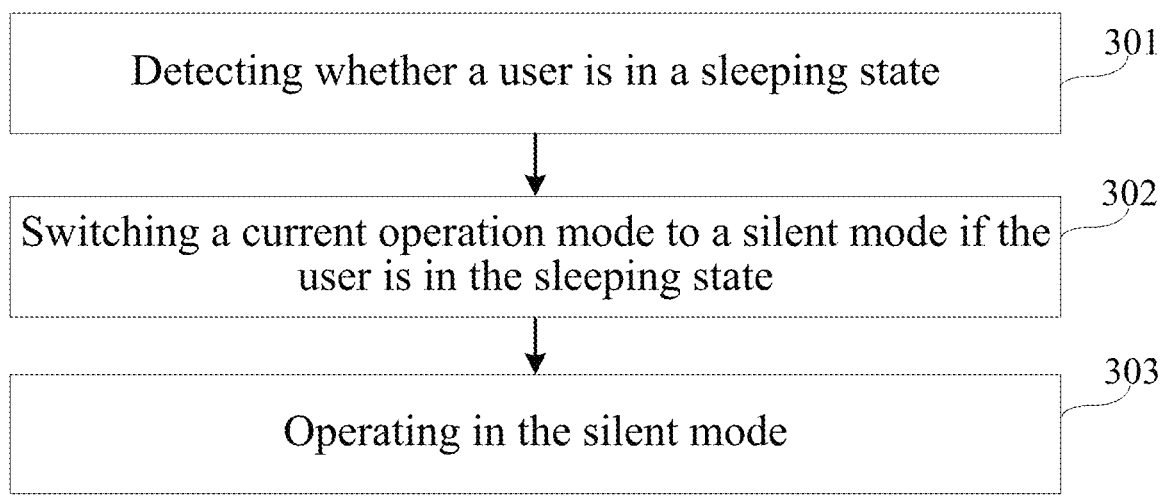
FIG. 2 is a flow chart of a method for mode switching according to an exemplary embodiment.

FIG. 2 is a flow chart of an exemplary method for mode switching consistent with embodiments of the present disclosure. This method can be implemented, for example, in the implementation environment shown in FIG. 1.

As shown in FIG. 2, at 301, whether a user is in a sleeping state is detected. For example, the household electrical appliance 140 detects whether the user is in the sleeping state. Whether the user is in the sleeping state can be detected using various approaches. Three exemplary approaches are described below.

According to the first approach, the wearable device 120 collects physiological data of the user, which may include at least one of heartbeat, pulse, or body movement. The wearable device 120 sends the collected physiological data of the user to the household electrical appliance 140. The household electrical appliance 140 detects whether the user is in the sleeping state according to the physiological data.

For example, when the heartbeat or pulse collected by the wearable device 120 is below a normal value for a non-sleeping state and/or the corresponding body movement is below a predetermined frequency, the household electrical appliance 140 determines that the user is in the sleeping state. On the other hand, when the heartbeat or pulse collected by the wearable device 120 is at the normal value for the non-sleeping state and/or the corresponding body movement is above the predetermined frequency, the household electrical appliance 140 determines that the user is in the non-sleeping state.

According to the second approach, the household electrical appliance 140 acquires an operation state of a wireless access point, and detects whether the user is in the sleeping state according to the operation state of the wireless access point. The wireless access point may be a router supporting a Wi-Fi network at home. The operation state of the wireless access point may be changed by manually turning on or off the wireless access point, or may be changed by turning on the wireless access point during a running time preset by the user and turning off the wireless access point during a non-running time.

For example, the user presets 9:00-23:00 as the running time of the wireless access point, and 23:00-9:00 the next day as the non-running time of the wireless access point. During 9:00-23:00, the operation state of the wireless access point acquired by the household electrical appliance 140 is the running state. During 23:00-9:00 the next day, the operation state of the wireless access point acquired by the household electrical appliance 140 is the non-running state.

When the wireless access point is in the running state, the household electrical appliance 140 determines that the user is in the non-sleeping state. On the other hand, when the wireless access point is in the non-running state, the household electrical appliance 140 determines that the user is in the sleeping state.

According to the third approach, the household electrical appliance 140 acquires a noise value of a current environment, and detects whether the user is in the sleeping state according to the noise value of the current environment. In some embodiments, the household electrical appliance 140 acquires the noise value of the current environment through a built-in noise meter or microphone. When the noise value of the current environment is larger than a bearable noise value for the sleeping state, the household electrical appliance 140 determines that the user is in the non-sleeping state. On the other hand, when the noise value of the current environment is smaller than the bearable noise value for the sleeping state, the household electrical appliance 140 determines that the user is in the sleeping state.

According to the present disclosure, any one of the above three approaches can be employed to detect whether the user is in the sleeping state. In some embodiments, two or more of the above approaches can be combined to detect whether the user is in the sleeping state. Using more approaches may increase the reliability of the detection result. In some embodiments, when two or more approaches are combined together, a weight may be assigned to each approach.

At 302, if the user is in the sleeping state, a current operation mode is switched to a silent mode.

At 303, the household electrical appliance 140 operates in the silent mode. For example, if the household electrical appliance 140 is provided with a muffler, the muffler is started. For an air purifier, the muffler may be a muffler layer or a muffler component disposed in an air flow passage or an air intake/exhaust system of a device, such as a fan or a blower, in the air purifier that has a loud noise at an exhaust port.

In some embodiments, if the household electrical appliance 140 includes a fan, the household electrical appliance 140 detects a sleep quality of the user according to the physiological data collected by the wearable device 120, and adjusts a speed of the fan in the household electrical appliance 140 according to the sleep quality of the user. For example, the sleep quality of the user may include a first sleep quality and a second sleep quality. The first sleep quality may also be referred to as a "light sleep state." The second sleep quality may also be referred to as a "sound sleep state." The first sleep quality is poorer than the second sleep quality. If the physiological data is consistent with physiological data of the first sleep quality, the household electrical appliance 140 detects that the user is in the first sleep quality. If the physiological data is consistent with physiological data of the second sleep quality, the household electrical appliance 140 detects that the user is in the second sleep quality.

Table 1 shows an example for adjusting the speed of the fan between speeds A and B according to the sleep quality.

TABLE 1

| Sleep quality | First sleep quality | Second sleep quality |
| --- | --- | --- |
| Speed of the fan | A r/s | B r/s |

In Table 1, A<B.

In some embodiments, the household electrical appliance 140 adjusts the speed of the fan according to the sleep quality of the user and a current air quality, so that the speed of the fan positively correlates to the sleep quality and negatively correlates to the current air quality. For example, the current air quality may include a first air quality, a second air quality, or a third air quality. The first air quality is better than the second air quality, and the second air quality is better than the third air quality.

For example, Table 2 shows an example for adjusting the speed of the fan among speeds A, B, C, D, E, and F according to the sleep quality and the current air quality.

TABLE 2

| Speed of the fan | First sleep quality (Light sleep) | Second sleep quality (Deep sleep) |
|---|---|---|
| First air quality | A r/s | B r/s |
| Second air quality | C r/s | D r/s |
| Third air quality | E r/s | F r/s |

In Table 2, A<B<C<D<E<F.

Figure 3:
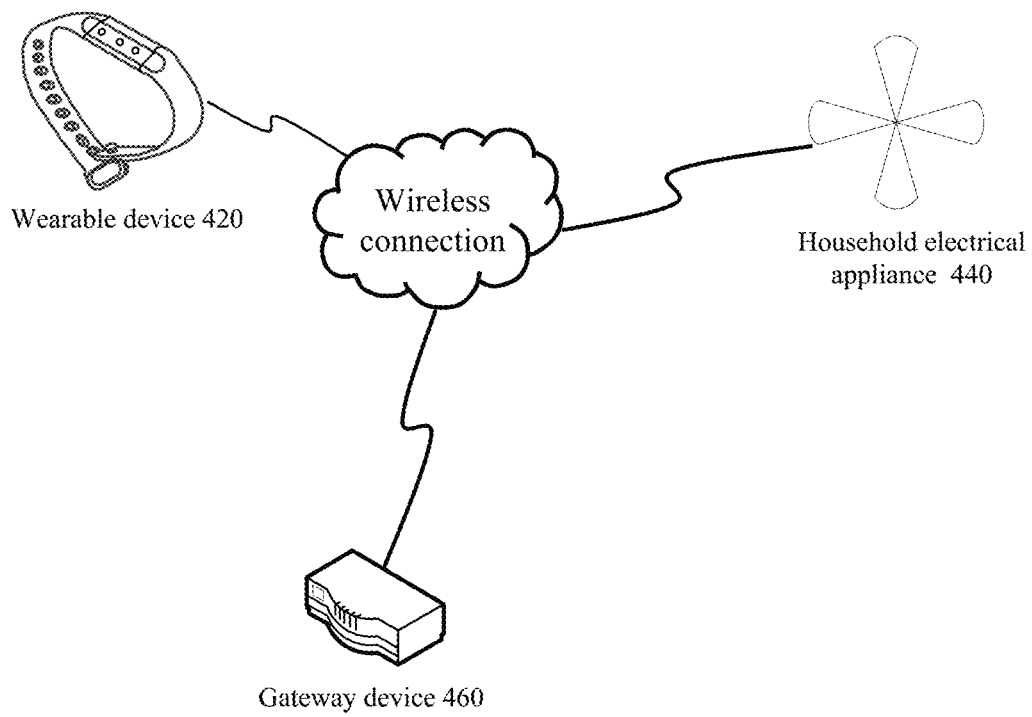
FIG. 3 is a schematic diagram of an implementing environment for methods for mode switching according to another exemplary embodiment.

FIG. 3 is a schematic diagram of another exemplary implementing environment for a method for mode switching consistent with embodiments of the present disclosure. This implementing environment includes a wearable device 420, a household electrical appliance 440, and a gateway device 460. The wearable device 420 and the household electrical appliance 440 can be connected to the gateway device 460 through a wireless connection. The wireless connection may be a Bluetooth connection or a WiFi connection.

The wearable device 420 is an electronic device that is capable of acquiring physiological data of a user and sending the physiological data to the gateway device 460. The function and structure of the wearable device 420 are similar to those of the wearable device 120, and thus detailed description thereof is omitted here. Similarly, the household electrical appliance 440 may include at least one of a fan, an air conditioner, a humidifier, or an air purifier, like the household electrical appliance 140. The gateway device 460 may be a router or a switch.

Figure 4:
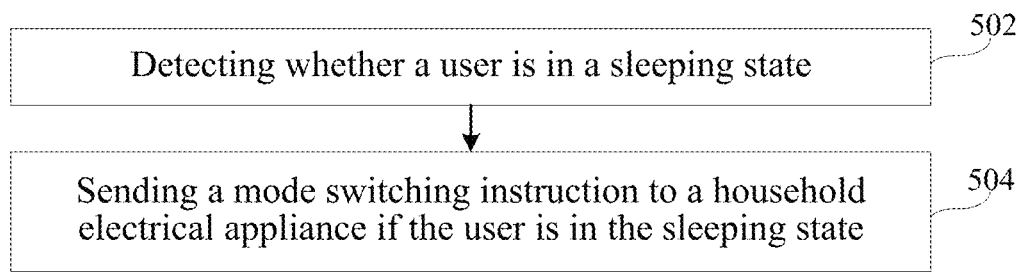
FIG. 4 is a flow chart of a method for mode switching according to another exemplary embodiment.

FIG. 4 is a flow chart of another exemplary method for mode switching consistent with embodiments of the present disclosure. This method can be implemented, for example, in the gateway device 460 shown in FIG. 3. As shown in FIG. 4, at 502, whether a user is in a sleeping state is detected. For example, the gateway device 460 detects whether the user is in the sleeping state by analyzing physiological data of the user sent by the wearable device 420. At 504, if the user is in the sleeping state, a mode switching instruction is sent to the household electrical appliance 440. For example, the gateway device 460 sends the mode switching instruction to the household electrical appliance 440 to switch a current operation mode to a silent mode according to the mode switching instruction, and to operate in the silent mode.

Figure 5:
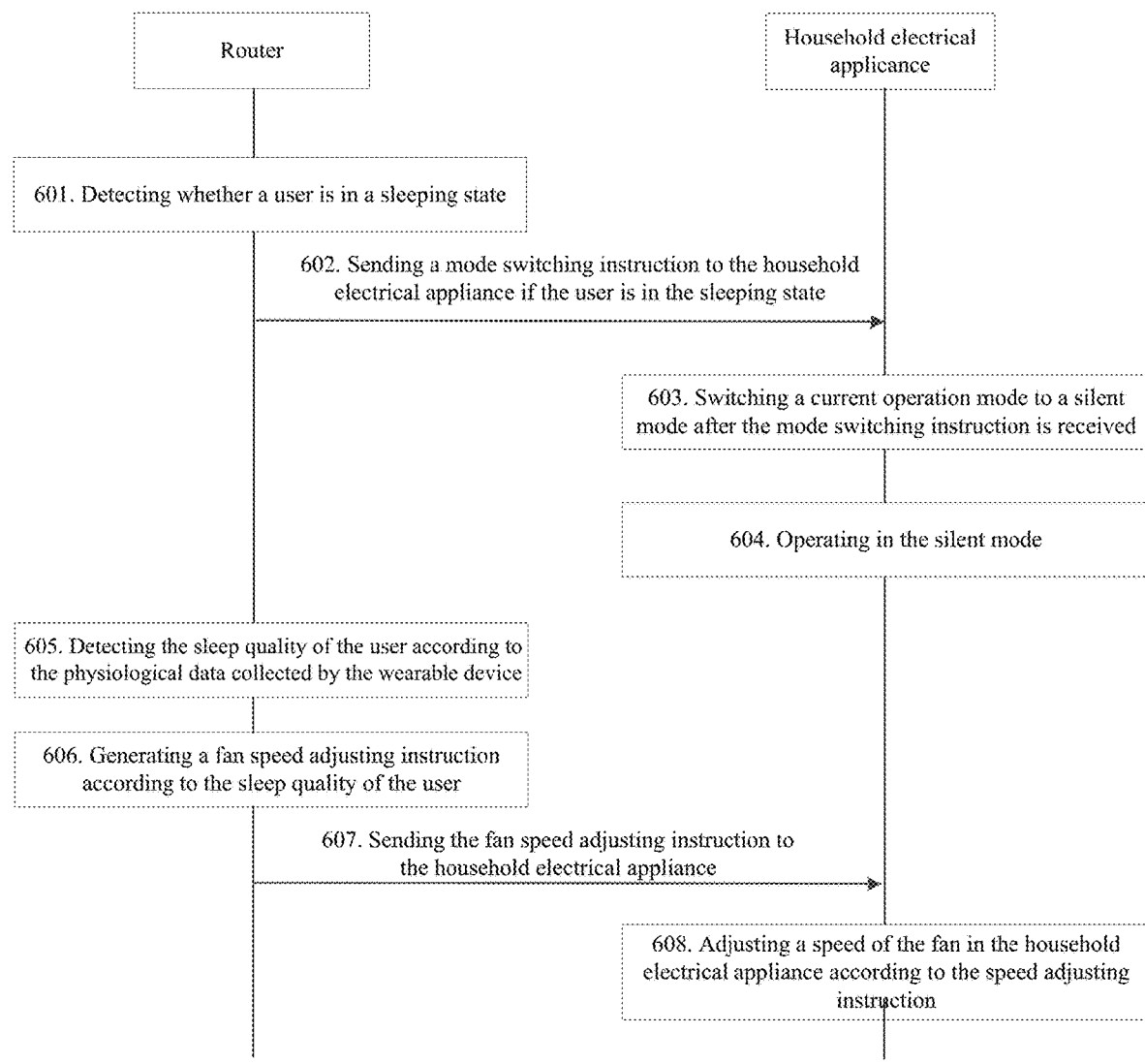
FIG. 5 is a flow chart of a method for mode switching according to another exemplary embodiment.

FIG. 5 is a flow chart of another exemplary method for mode switching consistent with embodiments of the present disclosure. This method can be implemented, for example, in the implementation environment shown in FIG. 3. In this method, a router is used as the gateway device 460.

As shown in FIG. 5, at 601, the router 460 detects whether a user is in a sleeping state. This can be accomplished using various approaches. Three exemplary approaches are described below.

According to the first approach, the wearable device 420 collects physiological data of the user, which may include at least one of heartbeat, pulse, or body movement. The wearable device 420 sends the collected physiological data of the user to the router 460. The router 460 detects whether the user is in the sleeping state according to the physiological data.

For example, when the heartbeat or pulse collected by the wearable device 420 is below a normal value for a non-sleeping state and/or the corresponding body movement is below a predetermined frequency, the router 460 determines that the user is in the sleeping state. On the other hand, when the heartbeat or pulse collected by the wearable device 420 is at the normal value for the non-sleeping state and/or the corresponding body movement is above the predetermined frequency, the router 460 determines that the user is in the non-sleeping state.

According to the second approach, the router 460 acquires an operation state of a wireless access point and detects whether the user is in the sleeping state according to the operation state of the wireless access point. The wireless access point may be a router supporting a Wi-Fi network at home, and thus can connect to the router 460 via this Wi-Fi network. In some embodiments, this Wi-Fi network is the wireless connection that connects the wearable device 420 and the household electrical appliance 440 to the router 460. In some embodiments, this Wi-Fi network is different from the wireless connection that connects the wearable device 420 and the household electrical appliance 440 to the router 460. The operation state of the wireless access point may be changed by manually turning on or off the wireless access point, or may be changed by turning on the wireless access point during a running time preset by the user and turning off the wireless access point during a non-running time.

For example, the user presets 9:00-23:00 as the running time of the wireless access point, and 23:00-9:00 the next day as the non-running time of the wireless access point. During 9:00-23:00, the operation state of the wireless access point acquired by the router 460 is the running state. During 23:00-9:00 the next day, the operation state of the wireless access point acquired by the router 460 is the non-running state.

When the wireless access point is in the running state, the router 460 determines that the user is in the non-sleeping state. On the other hand, when the wireless access point is in the non-running state, the router 460 determines that the user is in the sleeping state.

According to the third approach, the household electrical appliance 440 acquires a noise value of a current environment, and sends the noise value of the current environment to the router 460. In some embodiments, the household electrical appliance 440 acquires the noise value of the current environment through a built-in noise meter or microphone. The router 460 detects whether the user is in the sleeping state according to the noise value of the current environment. When the noise value of the current environment is larger than a bearable noise value for the sleeping state, the router 460 determines that the user is in the non-sleeping state. On the other hand, when the noise value of the current environment is smaller than the bearable noise value for the sleeping state, the router 460 determines that the user is in the sleeping state.

According to the present disclosure, any one of the above three approaches can be employed to detect whether the user is in the sleeping state. In some embodiments, two or more of the above approaches can be combined to detect whether the user is in the sleeping state. Using more approaches may increase the reliability of the detection result. In some embodiments, when two or more approaches are combined together, a weight may be assigned to each approach.

At 602, if the user is in the sleeping state, the router 460 sends a mode switching instruction to the household electrical appliance 440.

At 603, the household electrical appliance 440 switches a current operation mode to a silent mode after receiving the mode switching instruction.

At 604, the household electrical appliance 440 operates in the silent mode. For example, if the household electrical appliance 440 is provided with a muffler, the muffler is started. For an air purifier, the muffler may be a muffler layer or a muffler component for reducing noise, disposed in an air flow passage or an air intake/exhaust system of a device, such as a fan or a blower, in the air purifier that has a loud noise at an exhaust port.

In some embodiments, the household electrical appliance 440 is provided with a fan. In this scenario, at 605, the router 460 detects the sleep quality of the user according to the physiological data collected by the wearable device 420. For example, the sleep quality of the user may include the first sleep quality and the second sleep quality. The router 460 detects the sleep quality of the user according to which one of the first and second sleep qualities the physiological data collected by the wearable device 420 is consistent with.

At 606, the router 460 generates a fan speed adjusting instruction according to the sleep quality of the user. When the sleep quality of the user is the first sleep quality, the router 460 generates a first speed adjusting instruction corresponding to a first speed. When the sleep quality of the user is the second sleep quality, the router 460 generates a second speed adjusting instruction corresponding to a second speed. The first speed is lower than the second speed.

At 607, the router 460 sends the speed adjusting instruction to the household electrical appliance 440. The speed adjusting instruction may be the first speed adjusting instruction or the second speed adjusting instruction. In some embodiments, the speed adjusting instruction may include at least two types of speed adjusting instructions. The speed associated with the speed adjusting instruction may be preset by the user, or by maintenance personnel of the router 460.

At 608, the household electrical appliance 440 adjusts a speed of the fan in the household electrical appliance 440 according to the speed adjusting instruction. When the first speed adjusting instruction is received, the household electrical appliance 440 adjusts the speed of the fan to the first speed. On the other hand, when the second speed adjusting instruction is received, the household electrical appliance 440 adjusts the speed of the fan to the second speed.

In some embodiments, the router 460 adjusts the speed of the fan in the household electrical appliance 440 according to the sleep quality of the user and a current air quality. The router 460 detects the sleep quality of the user according to the physiological data collected by the wearable device. The household electrical appliance 440 detects the current air quality and sends the current air quality to the router 460. The router 460 then generates the speed adjusting instruction according to the sleep quality of the user and the current air quality, and sends the speed adjusting instruction to the household electrical appliance 440. The household electrical appliance 440 adjusts the speed of the fan in the household electrical appliance 440 according to the speed adjusting instruction, so that the speed of the fan positively correlates to the sleep quality and negatively correlates to the current air quality. For example, the current air quality may include the above-described first air quality, second air quality, or third air quality.

When the sleep quality of the user is the first sleep quality and the current air quality is the first air quality, the router 460 sends the first speed adjusting instruction to the household electrical appliance 440, and the household electrical appliance 440 adjusts the speed of the fan to the first speed according to the first speed adjusting instruction.

When the sleep quality of the user is the second sleep quality and the current air quality is the first air quality, the router 460 sends the second speed adjusting instruction to the household electrical appliance 440, and the household electrical appliance 440 adjusts the speed of the fan to the second speed according to the second speed adjusting instruction.

When the sleep quality of the user is the first sleep quality and the current air quality is the second air quality, the router 460 sends a third speed adjusting instruction to the household electrical appliance 440, and the household electrical appliance 440 adjusts the speed of the fan to a third speed according to the third speed adjusting instruction.

When the sleep quality of the user is the second sleep quality and the current air quality is the second air quality, the router 460 sends a fourth speed adjusting instruction to the household electrical appliance 440, and the household electrical appliance 440 adjusts the speed of the fan to a fourth speed according to the fourth speed adjusting instruction.

When the sleep quality of the user is the first sleep quality and the current air quality is the third air quality, the router 460 sends a fifth speed adjusting instruction to the household electrical appliance 440, and the household electrical appliance 440 adjusts the speed of the fan to a fifth speed according to the fifth speed adjusting instruction.

When the sleep quality of the user is the second sleep quality and the current air quality is the third air quality, the router 460 sends a sixth speed adjusting instruction to the household electrical appliance 440, and the household electrical appliance 440 adjusts the speed of the fan to a sixth speed according to the sixth speed adjusting instruction.

In some embodiments, the first speed is lower than the second speed, the second speed is lower than the third speed, the third speed is lower than the fourth speed, the fourth speed is lower than the fifth speed, and the fifth speed is lower than the sixth speed.

In some embodiments, the router 460 establishes binding relationships with the wearable device 420 and the household electrical appliance 440 in advance. In some embodiments, the router 460 establishes the binding relationships among the router 460, the wearable device 420, and the household electrical appliance 440 in advance according to an identification of the router 460, an identification of the wearable device 420, and an identification of the household electrical appliance 440. The household electrical appliance 440 only receives instructions sent by the router 460 with which the household electrical appliance 440 has established the binding relationship.

Figure 6:
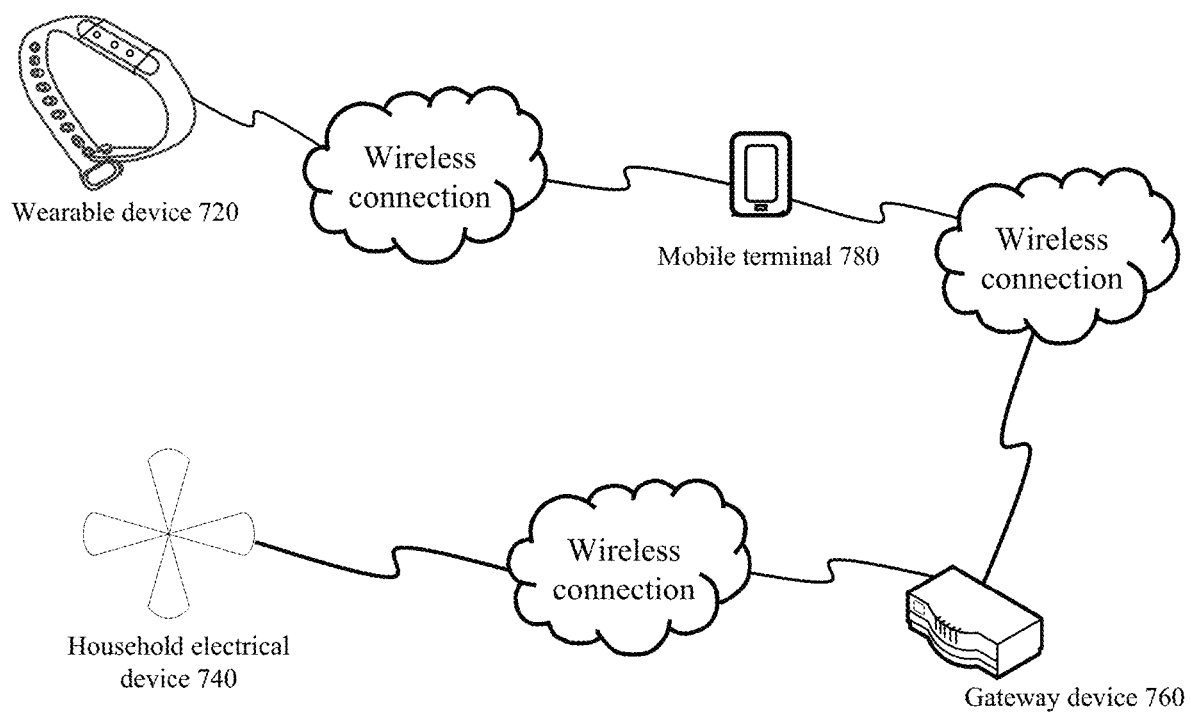
FIG. 6 is a schematic diagram of an implementing environment for methods for mode switching according to another exemplary embodiment.

FIG. 6 is a schematic diagram of an implementing environment for a method for mode switching consistent with embodiments of the present disclosure. This implementing environment includes a wearable device 720, a household electrical appliance 740, a gateway device 760, and a mobile terminal 780.

In some embodiments, as shown in FIG. 6, the mobile terminal 780 and the household electrical appliance 740 are respectively connected to the gateway device 760 through a wireless connection. The wireless connection may be a Bluetooth connection or a WiFi connection. The wearable device 720 may also be connected to the mobile terminal 780 through a wireless connection.

The wearable device 720 is an electronic device which is capable of acquiring physiological data of a user and sending the physiological data to the gateway device 760. The function and structure of the wearable device 720 are similar to those of the wearable device 120, and thus detailed description thereof is omitted here. Similarly, the household electrical appliance 740 may include at least one of a fan, an air conditioner, a humidifier, or an air purifier, like the household electrical appliance 140. The gateway device 760 may be a router or a switch.

The mobile terminal 780 may be an electronic device such as a smart phone, a tablet computer, an electronic reader, a notebook computer, or the like. The mobile terminal 780 functions similarly to the gateway device 460 shown in FIG. 3. Both the mobile terminal 780 and the gateway device 460 may be referred to as a controlling device coupled to a household electrical appliance.

Figure 7:
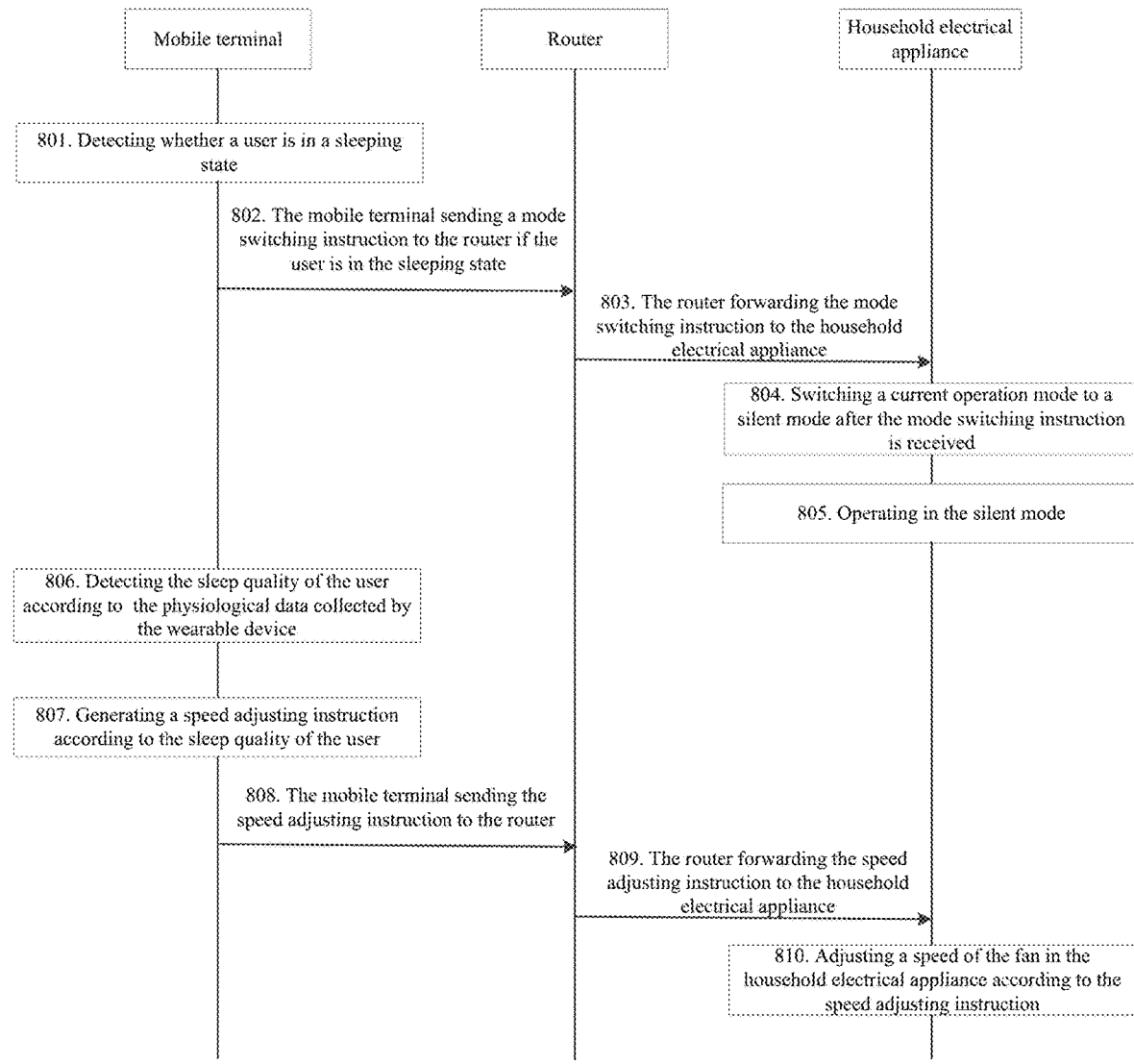
FIG. 7 is a flow chart of a method for mode switching according to another exemplary embodiment.

FIG. 7 is a flow chart of another exemplary method for mode switching consistent with embodiments of the present disclosure. This method can be implemented, for example, in the implementation environment shown in FIG. 6. In this method, a router is used as the gateway device 760.

At 801, the mobile terminal 780 detects whether a user is in a sleeping state. This can be accomplished using various approaches. Three exemplary approaches are described below.

According to the first approach, the wearable device 720 collects physiological data of the user, which may include at least one of heartbeat, pulse, or body movement. The wearable device 720 sends the collected physiological data of the user to the router 760, and the router 760 forwards the physiological data to the mobile terminal 780. The mobile terminal 780 detects whether the user is in the sleeping state according to the physiological data.

For example, when the heartbeat or pulse collected by the wearable device 720 is below a normal value for a non-sleeping state and/or the corresponding body movement is below a predetermined frequency, the mobile terminal 780 determines that the user is in the sleeping state. On the other hand, when the heartbeat or pulse collected by the wearable device 720 is at the normal value for the non-sleeping state and/or the corresponding body movement is above the predetermined frequency, the mobile terminal 780 determines that the user is in the non-sleeping state.

According to the second approach, the mobile terminal 780 acquires an operation state of a wireless access point and detects whether the user is in the sleeping state according to the operation state of the wireless access point. Similar to the wireless access point in the embodiments described above in connection with FIG. 5, the wireless access point here may be a router supporting a Wi-Fi network at home. The operation state of the wireless access point may be changed by manually turning on or off the wireless access point, or may be changed by turning on the wireless access point during a running time preset by the user and turning off the wireless access point during a non-running time.

For example, the user presets 9:00-23:00 as the running time of the wireless access point, and 23:00-9:00 the next day as the non-running time of the wireless access point. During 9:00-23:00, the operation state of the wireless access point acquired by the mobile terminal 780 is the running state. During 23:00-9:00 the next day, the operation state of the wireless access point acquired by the mobile terminal 780 is the non-running state.

When the wireless access point is in the running state, the mobile terminal 780 determines that the user is in the non-sleeping state. On the other hand, when the wireless access point is in the non-running state, the mobile terminal 780 determines that the user is in the sleeping state.

According to the third approach, the household electrical appliance 740 acquires a noise value of a current environment, and sends the noise value of the current environment to the router 760. The router 760 forwards the noise value of the current environment to the mobile terminal 780. In some embodiments, the household electrical appliance 740 acquires the noise value of the current environment through a built-in noise meter or microphone. The mobile terminal 780 detects whether the user is in the sleeping state according to the noise value of the current environment. When the noise value of the current environment is larger than a bearable noise value for the sleeping state, the mobile terminal 780 determines that the user is in the non-sleeping state. On the other hand, when noise value of the current environment is smaller than the bearable noise value for the sleeping state, the mobile terminal 780 determines that the user is in the sleeping state.

According to the present disclosure, any one of the above three approaches can be employed to detect whether the user is in the sleeping state. In some embodiments, two or more of the above approaches can be combined to detect whether the user is in the sleeping state. Using more approaches may increase the reliability of the detection result. In some embodiments, when two or more approaches are combined together, a weight may be assigned to each approach.

At 802, if the user is in the sleeping state, the mobile terminal 780 sends a mode switching instruction to the router 760.

At 803, the router 760 forwards the mode switching instruction to the household electrical appliance 740.

At 804, the household electrical appliance 740 switches a current operation mode to a silent mode after it receives the mode switching instruction.

At 805, the household electrical appliance 740 operates in the silent mode. For example, if the household electrical appliance is provided with a muffler, the muffler is started. For an air purifier, the muffler may be a muffler layer or a muffler component for reducing noise, disposed in an air flow passage or an air intake/exhaust system of a device, such as a fan or a blower, in the air purifier that has a loud noise at an exhaust port.

In some embodiments, the household electrical appliance 740 is further provided with a fan. In this scenario, at 806, the mobile terminal 780 detects the sleep quality of the user according to the physiological data collected by the wearable device. For example, the sleep quality of the user may include the above-described first sleep quality and the second sleep quality. The mobile terminal 780 detects the sleep quality of the user according to which one of the first and second sleep qualities the physiological data collected by the wearable device 720 is consistent with.

At 807, the mobile terminal 780 generates a speed adjusting instruction according to the sleep quality of the user. When the sleep quality of the user is the first sleep quality, the mobile terminal 780 generates the above-described first speed adjusting instruction corresponding to the first speed. When the sleep quality of the user is in the second sleep quality, the mobile terminal 780 generates the second speed adjusting instruction corresponding to the second speed. The first speed is lower than the second speed.

At 808, the mobile terminal 780 sends the speed adjusting instruction to the router 760. The speed adjusting instruction may be the first speed adjusting instruction or the second speed adjusting instruction. In some embodiments, the speed adjusting instruction may include at least two types of speed adjusting instructions. The speed associated with the speed adjusting instruction may be preset by the user, or by maintenance personnel of the mobile terminal 780.

At 809, the router 760 forwards the speed adjusting instruction to the household electrical appliance 740.

At 810, the household electrical appliance 740 adjusts a speed of the fan in the household electrical appliance 740 according to the speed adjusting instruction. When the first speed adjusting instruction is received, the household electrical appliance 740 adjusts the speed of the fan to the first speed. On the other hand, when the second speed adjusting instruction is received, the household electrical appliance 740 adjusts the speed of the fan to the second speed.

In some embodiments, the mobile terminal 780 adjusts the speed of the fan in the household electrical appliance 740 according to the sleep quality of the user and a current air quality. The mobile terminal 780 detects the sleep quality of the user according to the physiological data collected by the wearable device 720. The household electrical appliance 740 detects the current air quality and sends the current air quality to the router 760. The router 760 forwards the current air quality to the mobile terminal 780. The mobile terminal 780 then generates the speed adjusting instruction according to the sleep quality of the user and the current air quality, and sends the speed adjusting instruction to the router 760; which forwards the speed adjusting instruction to the household electrical appliance 740. The household electrical appliance 740 adjusts the speed of the fan in the household electrical appliance 740 according to the speed adjusting instruction, so that the speed of the fan positively correlates to the sleep quality and negatively correlates to the current air quality. For example, the current air quality may include the above-described first air quality, second air quality, or third air quality.

When the sleep quality of the user is the first sleep quality and the current air quality is the first air quality, the mobile terminal 780 sends the first speed adjusting instruction to the router 760, the router 760 forwards the first speed adjusting instruction to the household electrical appliance 740, and the household electrical appliance 740 adjusts the speed of the fan to the first speed according to the first speed adjusting instruction.

When the sleep quality of the user is the second sleep quality and the current air quality is the first air quality, the mobile terminal 780 sends the second speed adjusting instruction to the router 760, the router 760 forwards the second speed adjusting instruction to the household electrical appliance 740, and the household electrical appliance 740 adjusts the speed of the fan to the second speed according to the second speed adjusting instruction.

When the sleep quality of the user is the first sleep quality and the current air quality is the second air quality, the mobile terminal 780 sends the third speed adjusting instruction to the router 760, the router 760 forwards the third speed adjusting instruction to the household electrical appliance 740, and the household electrical appliance 740 adjusts the speed of the fan to the third speed according to the third speed adjusting instruction.

When the sleep quality of the user is the second sleep quality and the current air quality is the second air quality, the mobile terminal 780 sends the fourth speed adjusting instruction to the router 760, the router 760 forwards the fourth speed adjusting instruction to the household electrical appliance 740, and the household electrical appliance 740 adjusts the speed of the fan to the fourth speed according to the fourth speed adjusting instruction.

When the sleep quality of the user is the first sleep quality and the current air quality is the third air quality, the mobile terminal 780 sends the fifth speed adjusting instruction to the router 760, the router 760 forwards the fifth speed adjusting instruction to the household electrical appliance 740, and the household electrical appliance 740 adjusts the speed of the fan to the fifth speed according to the fifth speed adjusting instruction.

When the sleep quality of the user is the second sleep quality and the current air quality is the third air quality, the mobile terminal 780 sends the sixth speed adjusting instruction to the router 760, the router 760 forwards the sixth speed adjusting instruction to the household electrical appliance 740, and the household electrical appliance 740 adjusts the speed of the fan to the sixth speed according to the sixth speed adjusting instruction.

In some embodiments, the first speed is lower than the second speed, the second speed is lower than the third speed, the third speed is lower than the fourth speed, the fourth speed is lower than the fifth speed, and the fifth speed is lower than the sixth speed.

In some embodiments, the mobile terminal 780 establishes binding relationships with the wearable device 720 and the household electrical appliance 740 in advance. In some embodiments, the mobile terminal 780 establishes the binding relationships among the mobile terminal 780, the wearable device 720, and the household electrical appliance 740 according to an identification of the mobile terminal 780, an identification of the wearable device 720, and an identification of the household electrical appliance 740. The household electrical appliance 740 only receives controlling instruction sent by the mobile terminal 780 with which the household electrical appliance 740 has an established binding relationship.

Figure 8:
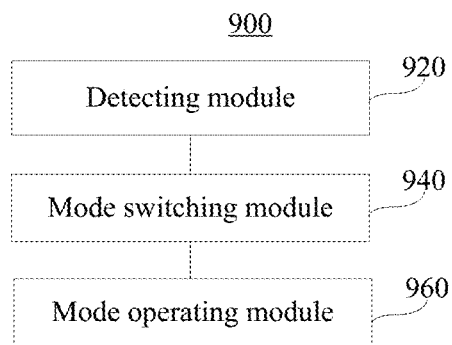
FIG. 8 is a block diagram of a device for mode switching according to an exemplary embodiment.

FIG. 8 is a block diagram of an exemplary device 900 for mode switching consistent with embodiments of the present disclosure. The device 900 may be implemented as a part or a whole of the household electrical appliance 140 in the implementation environment shown in FIG. 1 in a form of software, hardware, or a combination of both.

As shown in FIG. 8, the device 900 includes a detecting module 920, a mode switching module 940, and a mode operating module 960. The detecting module 920 is configured to detect whether a user is in a sleeping state. The mode switching module 940 is configured to switch a current operation mode to a silent mode if the user is in the sleeping state. The mode operating module 960 is configured to cause the device 900 to operate in the silent mode.

Figure 9:
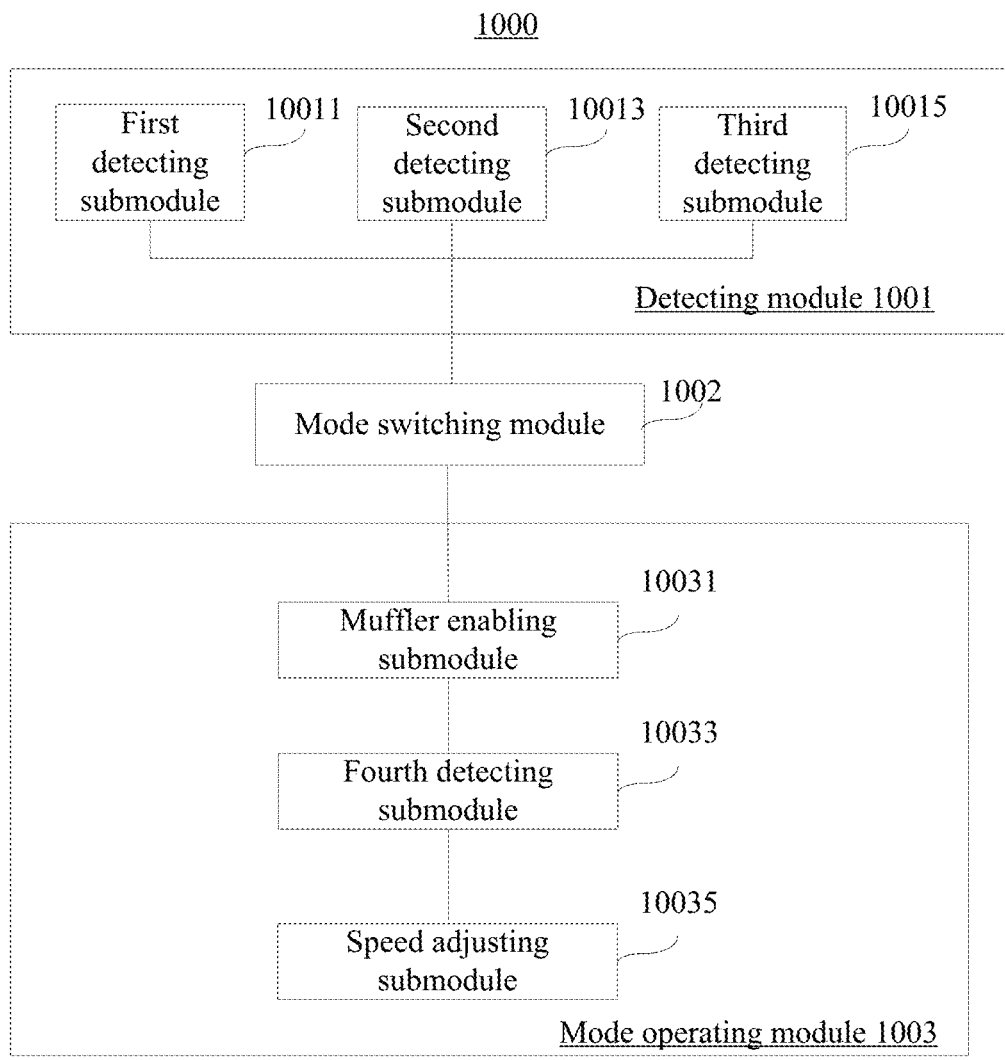
FIG. 9 is a block diagram of a device for mode switching according to another exemplary embodiment.

FIG. 9 is a block diagram of another exemplary device 1000 for mode switching consistent with embodiments of the present disclosure. The device 1000 may be implemented as a part or a whole of the household electrical appliance 140 in the implementation environment shown in FIG. 1 in a form of software, hardware, or a combination of both.

As shown in FIG. 9, the device 1000 includes a detecting module 1001, a mode switching module 1002, and a mode operating module 1003. The detecting module 1001 is configured to detect whether a user is in a sleeping state. The mode switching module 1002 is configured to switch a current operation mode to a silent mode if the user is in the sleeping state. The mode operating module 1003 is configured to cause the device 1000 to operate in the silent mode.

In some embodiments, as shown in FIG. 9, the detecting module 1001 includes at least one of a first detecting submodule 10011, a second detecting submodule 10013, or a third detecting submodule 10015. The first detecting submodule 10011 is configured to acquire physiological data of the user that is collected by a wearable device, and detect whether the user is in the sleeping state according to the physiological data. The second detecting submodule 10013 is configured to acquire an operation state of a wireless access point, and detect whether the user is in the sleeping state according to the operation state of the wireless access point. The third detecting submodule 10015 is configured to acquire a noise value of a current environment, and detect whether the user is in the sleeping state according to the noise value of the current environment.

In some embodiments, the device 1000 further includes a muffler. In this scenario, as shown in FIG. 9, the mode operating module 1003 includes a muffler enabling submodule 10031 configured to enable the muffler.

In some embodiments, as shown in FIG. 9, the mode operating module 1003 further includes a fourth detecting submodule 10033 configured to detect sleep quality of the user according to the physiological data collected by the wearable device, and a speed adjusting submodule 10035 configured to adjust a speed of the fan in the device 1000 according to the sleep quality of the user. In some embodiments, the speed adjusting submodule 10035 is configured to adjust the speed of the fan according to the sleep quality of the user and a current air quality.

Figure 10:
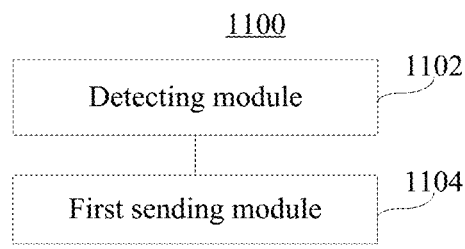
FIG. 10 is a block diagram of a device for mode switching according to another exemplary embodiment.

FIG. 10 is a block diagram of another exemplary device 1100 for mode switching consistent with embodiments of the present disclosure. The device 1100 may be implemented as a part or a whole of the router 460 in the implementation environment shown in FIG. 3 or of the mobile terminal 780 in the implementation environment shown in FIG. 6 in a form of software, hardware, or a combination of both. As shown in FIG. 10, the device 1100 includes a detecting module 1102 configured to detect whether a user is in a sleeping state and a sending module 1104 configured to send a mode switching instruction to a household electrical appliance when the user is in the sleeping state. The household electrical appliance then switches a current operation mode to a silent mode according to the mode switching instruction and operates in the silent mode.

Figure 11:
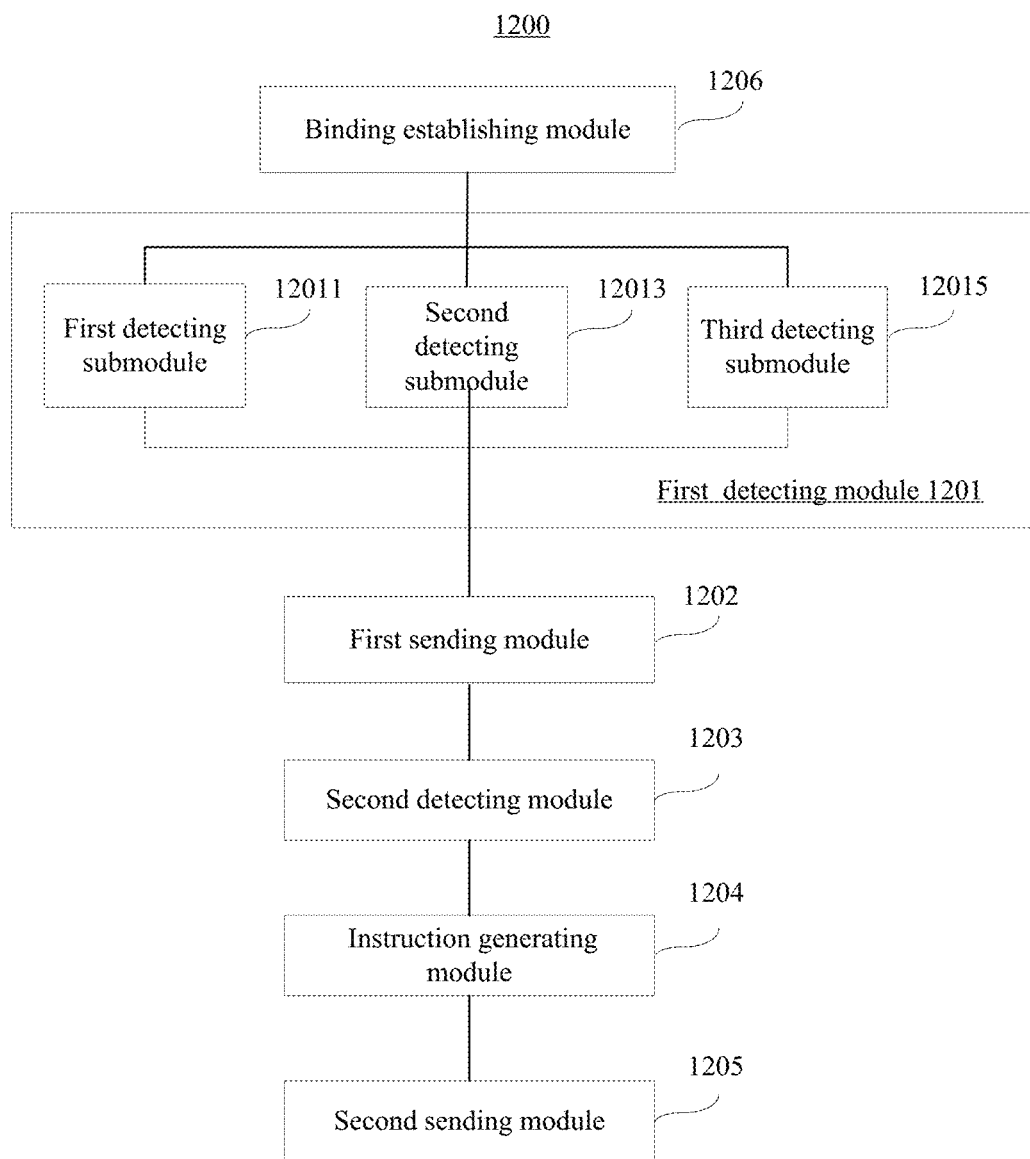
FIG. 11 is a block diagram of a device for mode switching according to another exemplary embodiment.

FIG. 11 is a block diagram of an exemplary device 1200 for mode switching consistent with embodiments of the present disclosure. The device 1200 may be implemented as a part or a whole of the router 460 in the implementation environment shown in FIG. 3 or of the mobile terminal 780 in the implementation environment shown in FIG. 6 in a form of software, hardware, or a combination of both. As shown in FIG. 11, the device 1200 includes a first detecting module 1201 configured to detect whether a user is in a sleeping state and a first sending module 1202 configured to send a mode switching instruction to a household electrical appliance when the user is in the sleeping state. The household electrical appliance then switches a current operation mode to a silent mode according to the mode switching instruction and operates in the silent mode.

In some embodiments, as shown in FIG. 11, the first detecting module 1201 includes at least one of a first detecting submodule 12011, a second detecting submodule 12013, or a third detecting submodule. The first detecting submodule 12011 is configured to acquire physiological data of the user that is collected by a wearable device and detect whether the user is in the sleeping state according to the physiological data. The second detecting submodule 12013 is configured to acquire an operation state of a wireless access point and detect whether the user is in the sleeping state according to the operation state of the wireless access point. The third detecting submodule 12015 is configured to acquire a noise value of a current environment and detect whether the user is in the sleeping state according to the noise value of the current environment.

In some embodiments, as shown in FIG. 11, the device 1200 further includes a second detecting module 1203 configured to detect sleep quality of the user according to the physiological data collected by the wearable device, an instruction generating module 1204 configured to generate a speed adjusting instruction according to the sleep quality of the user, and a second sending module 1205 configured to send the speed adjusting instruction to the household electrical appliance. The household electrical appliance then adjusts a speed of the fan in the household electrical appliance according to the speed adjusting instruction. In some embodiments, the instruction generating module 1204 is configured to generate the speed adjusting instruction according to the sleep quality of the user and the current air quality.

In some embodiments, as shown in FIG. 11, the device 1200 further includes a binding establishing module 1206 configured to establish binding relationships with the wearable device and the household electrical appliance in advance.

Figure 12:
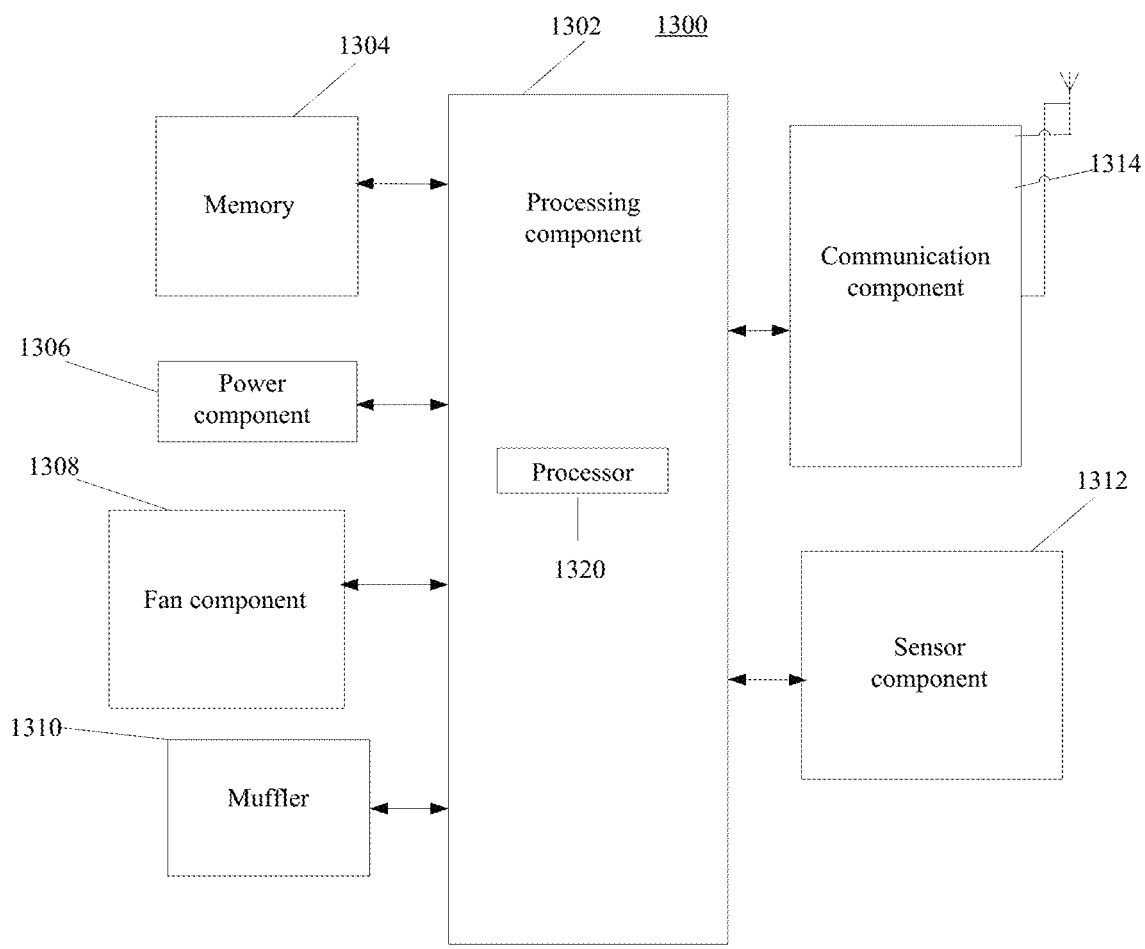
FIG. 12 is a block diagram of a device for mode switching according to another exemplary embodiment.

FIG. 12 is a block diagram of an exemplary device 1300 for mode switching consistent with embodiments of the present disclosure. The device 1300 is for example used in the household appliance in the implementation environment shown in FIG. 1, 3, or 6.

As shown in FIG. 12, the device 1300 includes one or more of the following components: a processing component 1302, a memory 1304, a power component 1306, a fan component 1308, a muffler 1310, a sensor component 1312, and a communication component 1314.

The processing component 1302 typically controls overall operations of the device 1300, such as the operations associated with display, telephone calls, data communications, camera operations, and recording operations. The processing component 1302 may include one or more processors 1320 to execute instructions to perform all or part of the methods consistent with embodiments of the present disclosure. Moreover, the processing component 1302 may include one or more modules which facilitate the interaction between the processing component 1302 and other components.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The fan component 1308 is a component in the device 1300 that generates noise and improves air quality.

The muffler 1310 is a component in the device 1300 that blocks sound transmission while allowing air flow, thus reducing aerodynamic noise. The muffler 1310 may be a device for reducing noise which is disposed in an air flow passage or in an air intake/exhaust system of a device, such as a fan or a blower, with a loud noise at an exhaust port.

The sensor component 1312 includes one or more sensors to provide status assessments of various aspects of the device 1300. The sensor component 1312 may include a noise meter or a microphone, configured to detect a noise value of a current environment.

The communication component 1314 is configured to facilitate communication, wired or wirelessly, between the device 1300 and other devices. The device 1300 can access a wireless network based on a communication standard, such as WiFi, 2G, or 3G, or a combination thereof. In one exemplary embodiment, the communication component 1314 receives a broadcast signal or broadcast associated information from an external broadcast management system via a broadcast channel In one exemplary embodiment, the communication component 1314 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for mode switching shown in FIG. 2.

In exemplary embodiments, there is also provided a non-transitory computer-readable storage medium, such as included in the memory 1304, storing instructions executable by the processor 1320 in the device 1300, for performing the methods consistent with embodiments of the present disclosure. For example, the non-transitory computer-readable storage medium may be a ROM, a RAM, a CD-ROM, a magnetic tape, a floppy disc, an optical data storage device, or the like.

Figure 13:
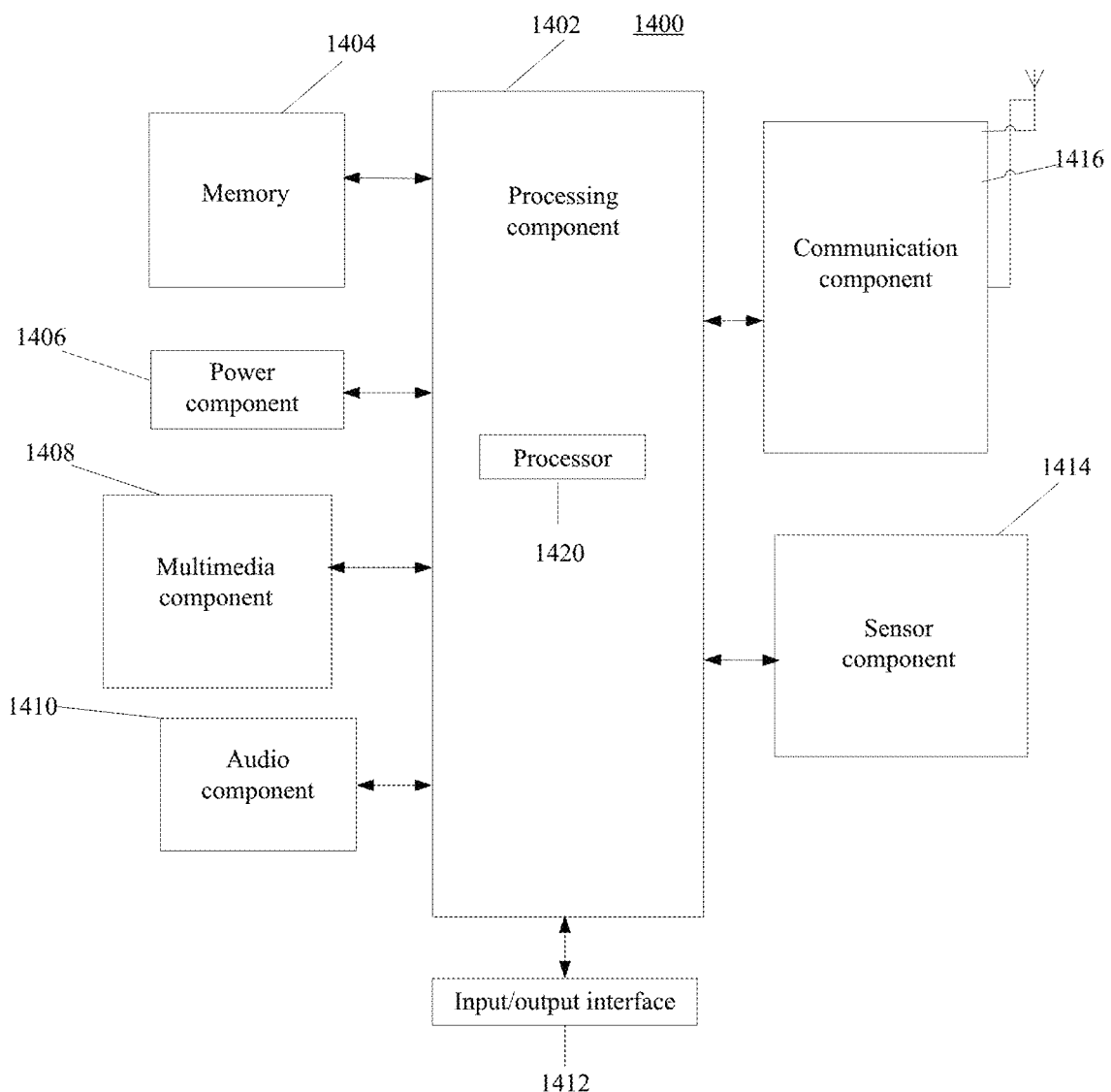
FIG. 13 is a block diagram of a device for mode switching according to another exemplary embodiment.

FIG. 13 is a block diagram of an exemplary device 1400 for mode switching consistent with embodiments of the present disclosure. The device 1400 is for example used in the router 460 in the implementation environment shown in FIG. 3 or in the mobile terminal 780 in the implementation environment shown in FIG. 6. For example, the device 1400 may be a mobile phone, a computer, a digital broadcast terminal, a messaging device, a gaming console, a tablet, a medical device, exercise equipment, a personal digital assistant, or the like.

As shown in FIG. 13, the device 1400 includes one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keypad, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the device 1400 and other devices. The device 1400 can access a wireless network based on a communication standard, such as WiFi, 2G, or 3G, or a combination thereof. In one exemplary embodiment, the communication component 1416 receives a broadcast signal or broadcast associated information from an external broadcast management system via a broadcast channel In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for mode switching consistent with embodiments of the present disclosure.

In exemplary embodiments, there is also provided a non-transitory computer-readable storage medium, such as included in the memory 1404, storing instructions executable by the processor 1420 in the device 1400, for performing the methods consistent with embodiments of the present disclosure. For example, the non-transitory computer-readable storage medium may be a ROM, a RAM, a CD-ROM, a magnetic tape, a floppy disc, an optical data storage device, or the like.

Specific operations of devices consistent with embodiments of the present disclosure are similar to the methods described above in this disclosure, and thus detailed description thereof is omitted here.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a household electrical appliance to perform mode switching, wherein the household electrical appliance includes a fan, the method comprising:
  detecting whether a user is in a sleeping state;
  switching, if the user is in the sleeping state, a current operation mode to a silent mode; and
  operating in the silent mode, including:
    detecting a current air quality; and
    adjusting a speed of the fan based on a sleep quality of the user and the current air quality, to cause the speed of the fan to be positively correlated with the sleep quality of the user, and to be negatively correlated with the current air quality, the adjusting comprising:
      when the sleep quality of the user is a first sleep quality and the current air quality is a first air quality, adjusting the speed of the fan to a first speed;
      when the sleep quality of the user is a second sleep quality and the current air quality is the first air quality, adjusting the speed of the fan to a second speed;
      when the sleep quality of the user is the first sleep quality and the current air quality is a second air quality, adjusting the speed of the fan to a third speed;
      when the sleep quality of the user is the second sleep quality and the current air quality is the second air quality, adjusting the speed of the fan to a fourth speed;
      when the sleep quality of the user is the first sleep quality and the current air quality is a third air quality, adjusting the speed of the fan to a fifth speed; and
      when the sleep quality of the user is the second sleep quality and the current air quality is the third air quality, adjusting the speed of the fan to a sixth speed,
    wherein the first sleep quality is poorer than the second sleep quality, the first air quality is better than the second air quality, and the second air quality is better than the third air quality, the first speed is lower than the second speed, the second speed is lower than the third speed, the third speed is lower than the fourth speed, the fourth speed is lower than the fifth speed, and the fifth speed is lower than the sixth speed.

2. The method according to claim 1, wherein detecting whether the user is in the sleeping state further comprises at least one of:
  acquiring physiological data of the user and detecting whether the user is in the sleeping state based on the physiological data;
  acquiring an operation state of a wireless access point and detecting whether the user is in the sleeping state based on the operation state of the wireless access point; or
  acquiring a noise value of a current environment and detecting whether the user is in the sleeping state based on the noise value.

3. The method according to claim 2, wherein operating in the silent mode includes:
  detecting the sleep quality of the user based on the physiological data.

4. The method according to claim 1, wherein:
  the household electrical appliance includes a muffler, and operating in the silent mode includes enabling the muffler.

5. A method for a controlling device coupled to a household electrical appliance to perform mode switching, wherein the household electrical appliance includes a fan, the method comprising:
  detecting whether a user is in a sleeping state; and
  sending, if the user is in the sleeping state, a mode switching instruction to the household electrical appliance to switch a current operation mode of the household electrical appliance, to cause the household electrical appliance operates in a silent mode, including:
    detecting a current air quality; and
    adjusting a speed of the fan based on a sleep quality of the user and the current air quality, to cause the speed of the fan to be positively correlated with the sleep quality of the user, and to be negatively correlated with the current air quality, the adjusting comprising:

when the sleep quality of the user is a first sleep quality and the current air quality is a first air quality, adjusting the speed of the fan to a first speed;

when the sleep quality of the user is a second sleep quality and the current air quality is the first air quality, adjusting the speed of the fan to a second speed;

when the sleep quality of the user is the first sleep quality and the current air quality is a second air quality, adjusting the speed of the fan to a third speed;

when the sleep quality of the user is the second sleep quality and the current air quality is the second air quality, adjusting the speed of the fan to a fourth speed;

when the sleep quality of the user is the first sleep quality and the current air quality is a third air quality, adjusting the speed of the fan to a fifth speed; and when the sleep quality of the user is the second sleep quality and the current air quality is the third air quality, adjusting the speed of the fan to a sixth speed, wherein the first sleep quality is poorer than the second sleep quality, the first air quality is better than the second air quality, and the second air quality is better than the third air quality, the first speed is lower than the second speed, the second speed is lower than the third speed, the third speed is lower than the fourth speed, the fourth speed is lower than the fifth speed, and the fifth speed is lower than the sixth speed.

6. The method according to claim 5, wherein detecting whether the user is in the sleeping state further comprises at least one of:

acquiring physiological data of the user and detecting whether the user is in the sleeping state based on the physiological data;

acquiring an operation state of a wireless access point and detecting whether the user is in the sleeping state based on the operation state of the wireless access point; or acquiring a noise value of a current environment and detecting whether the user is in the sleeping state based on the noise value.

7. The method according to claim 6, further comprising:

detecting the sleep quality of the user based on the physiological data;

generating a speed adjusting instruction based on the sleep quality; and sending the speed adjusting instruction to the household electrical appliance to adjust the speed of the fan based on the speed adjusting instruction.

8. The method according to claim 7, wherein generating the speed adjusting instruction includes generating the speed adjusting instruction based on the sleep quality and the current air quality.

9. The method according to claim 5, further comprising:

establishing a binding relationship with the household electrical appliance in advance.

10. A household electrical appliance device including a fan, comprising:

a processor; and a non-transitory computer-readable storage medium storing instructions that, when executed by the processor, cause the processor to:

detect whether a user is in a sleeping state;

switch, if the user is in the sleeping state, a current operation mode to a silent mode; and operate the device in the silent mode, including:

detecting a current air quality; and adjusting a speed of the fan based on a sleep quality of the user and the current air quality, to cause the speed of the fan to be positively correlated with the sleep quality of the user, and to be negatively correlated with the current air quality, the adjusting comprising:

when the sleep quality of the user is a first sleep quality and the current air quality is a first air quality, adjusting the speed of the fan to a first speed;

when the sleep quality of the user is a second sleep quality and the current air quality is the first air quality, adjusting the speed of the fan to a second speed;

when the sleep quality of the user is the first sleep quality and the current air quality is a second air quality, adjusting the speed of the fan to a third speed;

when the sleep quality of the user is the second sleep quality and the current air quality is the second air quality, adjusting the speed of the fan to a fourth speed;

when the sleep quality of the user is the first sleep quality and the current air quality is a third air quality, adjusting the speed of the fan to a fifth speed; and when the sleep quality of the user is the second sleep quality and the current air quality is the third air quality, adjusting the speed of the fan to a sixth speed, wherein the first sleep quality is poorer than the second sleep quality, the first air quality is better than the second air quality, and the second air quality is better than the third air quality, the first speed is lower than the second speed, the second speed is lower than the third speed, the third speed is lower than the fourth speed, the fourth speed is lower than the fifth speed, and the fifth speed is lower than the sixth speed.

11. The device according to claim 10, wherein the instructions further cause the processor to perform at least one of:

acquiring physiological data of the user and detecting whether the user is in the sleeping state based on the physiological data;

acquiring an operation state of a wireless access point and detecting whether the user is in the sleeping state based on the operation state of the wireless access point; or acquiring a noise value of a current environment and detecting whether the user is in the sleeping state based on the noise value.

12. The device according to claim 11, wherein the instructions further cause the processor to:

detect the sleep quality of the user based on the physiological data.

13. The device according to claim 10, further comprising:

a muffler, wherein the instructions further cause the processor to enable the muffler so as to operate the device in the silent mode.

14. A controlling device coupled to a household electrical appliance including a fan, the controlling device comprising:

a processor; and a non-transitory computer-readable storage medium storing instructions that, when executed by the processor, cause the processor to:

detect whether a user is in a sleeping state; and send, if the user is in the sleeping state, a mode switching instruction to the household electrical appliance to switch a current operation mode of the household electrical appliance, to cause the household electrical appliance operates in a silent mode, including:
detecting a current air quality; and
adjusting a speed of the fan based on a sleep quality of the user and the current air quality, to cause the speed of the fan to be positively correlated with the sleep quality of the user, and to be negatively correlated with the current air quality, the adjusting comprising:
when the sleep quality of the user is a first sleep quality and the current air quality is a first air quality, adjusting the speed of the fan to a first speed;
when the sleep quality of the user is a second sleep quality and the current air quality is the first air quality, adjusting the speed of the fan to a second speed;
when the sleep quality of the user is the first sleep quality and the current air quality is a second air quality, adjusting the speed of the fan to a third speed;
when the sleep quality of the user is the second sleep quality and the current air quality is the second air quality, adjusting the speed of the fan to a fourth speed;
when the sleep quality of the user is the first sleep quality and the current air quality is a third air quality, adjusting the speed of the fan to a fifth speed; and
when the sleep quality of the user is the second sleep quality and the current air quality is the third air quality, adjusting the speed of the fan to a sixth speed,
wherein the first sleep quality is poorer than the second sleep quality, the first air quality is better than the second air quality, and the second air quality is better than the third air quality, the first speed is lower than the second speed, the second speed is lower than the third speed, the third speed is lower than the fourth speed, the fourth speed is lower than the fifth speed, and the fifth speed is lower than the sixth speed.

15. The device according to claim 14, wherein the instructions further cause the processor to perform at least one of:
acquiring physiological data of the user and detecting whether the user is in the sleeping state based on the physiological data;
acquiring an operation state of a wireless access point and detecting whether the user is in the sleeping state based on the operation state of the wireless access point; or
acquiring a noise value of a current environment and detecting whether the user is in the sleeping state based on the noise value.

16. The device according to claim 15, wherein
the instructions further cause the processor to:
detect the sleep quality of the user based on the physiological data;
generate a speed adjusting instruction based on the sleep quality; and
send the speed adjusting instruction to the household electrical appliance to adjust the speed of the fan based on the speed adjusting instruction.

17. The device according to claim 16, wherein the instructions further cause the processor to:
generate the speed adjusting instruction based on the sleep quality and the current air quality.

18. The device according to claim 14, wherein the instructions further cause the processor to establish a binding relationship with the household electrical appliance in advance.

19. The method according to claim 2, wherein the wireless access point comprises a router configured to support a communication network of the household and the operating state of the router comprises a running state or a non-running state.

20. The method according to claim 19, wherein the user is determined to be in the sleeping state when the operating state of the router is the non-running state.

* * * * *